United States Patent
Capra

[11] 3,793,667
[45] Feb. 26, 1974

[54] VEHICLE-WASHING APPARATUS

[76] Inventor: Uberto Capra, Alte Ceccato, Vicenza, Italy

[22] Filed: Mar. 27, 1972

[21] Appl. No.: 238,369

[30] Foreign Application Priority Data
Apr. 30, 1971 Italy .............................. 23918 A/71
May 22, 1971 Italy .............................. 24865 A/71

[52] U.S. Cl. ............................ 15/21 E, 15/DIG. 2
[51] Int. Cl. ................................................ B60s 3/06
[58] Field of Search ........ 15/DIG. 2, 21 D, 21 E, 53

[56] References Cited
UNITED STATES PATENTS
3,304,565  2/1967  Fuhring .............................. 15/21 E
3,579,700  5/1971  Haley ................................. 15/21 E
3,689,954  9/1972  Grant ................................. 15/21 E Primary Examiner—Edward L. Roberts
Attorney, Agent, or Firm—Karl F. Ross; Herbert Dubno

[57] ABSTRACT

Two rotary scrubbing brushes, suspended from the lintel of a portal frame which straddles the path of a vehicle to be washed, are so balanced as to hang at an angle from the upper corners of the frame with their lower ends touching or crossing in the region of the centerline of the path. According to its direction of rotation, a brush coming into contact with an end of a vehicle moving relatively to the portal frame is swung either outwardly, to scrub a side of the vehicle, or upwardly to sweep a horizontal top surface thereof.

11 Claims, 8 Drawing Figures

VEHICLE-WASHING APPARATUS

My present invention relates to an apparatus for scrubbing the surfaces of automobiles or other vehicles by means of rotary brushes in a washing station, e.g. as described in my prior U.S. Pat. Nos. 3,500,487 and 3,618,152.

In such washing stations it is customary to provide a portal frame whose uprights or jambs straddle the path of a vehicle to be washed while its lintel extends transversely above this vehicle, the frame and the vehicle being relatively movable in a longitudinal direction (i.e. at right angles to the lintel) during a scrubbing operation. For this purpose, the frame jambs may be mounted on rail-supported rollers or the vehicle may be slowly driven or towed through the frame.

In accordance with the teachings of these prior patents, brushes vertically suspended from the portal frame are used to scrub the sides of the vehicle whereas a horizontally mounted brush, moving up and down in accordance with the vehicular profile, washes its upper surfaces (hood, roof and trunk). As described in the later one of these patents, a vertical brush may be guided along the frame for movement across the latter, i.e. transversely to the vehicle path, during relative standstill of the frame and the vehicle for scrubbing the front and rear surfaces of the car, a lateral surface being scrubbed with the brush in an offset position during relative motion of the vehicle and the frame.

The general object of my present invention is to provide an improved installation of this character in which the mechanism for displacing and guiding such a brush is greatly simplified.

A more particular object is to provide means in such an installation for enabling a single brush to sweep at least a part of the top, front, rear and lateral surfaces of a vehicle.

These objects are realized, in accordance with the present invention, by the provision of at least one rotary scrubbing brush—but preferably a pair of such brushes—pivotally mounted on a support overlying the vehicular path, such as the lintel of a portal frame, so as to be swingable in a plane perpendicular to that path while rotating about its axis; the drive means imparting such rotation to the brush may be an electric motor carried on a bracket wherein the brush shaft is journaled and which is pivotally connected with the support. More particularly, with two brushes fulcrumed near respective corners of the portal frame, they should be so balanced as to hang down along downwardly converging inclined axes, the lower brush ends closely approaching each other or crossing substantially at the centerline of the vehicular path and therefore in the vertical plane of symmetry of the frame. If the brushes are mounted on the same face (front or rear) of the frame, they may touch and even somewhat deform each other in their quiescent position along that plane of symmetry; in that event the other face of the frame may be used to accommodate a conventionally mounted horizontal scrubbing brush for the top surfaces of the vehicle which cannot be reached by the pivoting brushes. If, however, the brushes are carried on opposite frame faces, they can be swung up to a substantially horizontal position above the vehicle so as to eliminate the need for a supplemental horizontal brush. In either case, the swing of the brush from its initial inclined attitude into an elevated horizontal position or a laterally offset vertical position may be brought about exclusively or in part by the frictional engagement between the rotating brush and the front or rear surface of a vehicle coming into contact therewith. With reversal of the relative frame motion in the course of a washing cycle, the sense of rotation of either brush may remain unchanged throughout the cycle as it sweeps the vehicular surfaces assigned to it.

The desired inclination of the idle brush can be brought about by offsetting its fulcrum from its axis of rotation and/or by an off-axial weight carried on the brush mount; such a weight could also be replaced or supplemented by a biasing spring anchored to the frame and to the pivoted brush mount. The brush support proper need not be a rigid part of the portal frame but may comprise a member (or a pair of members) rotatable about a horizontal axis transverse to the vehicular path so that the brush can yield to pressure in the direction of relative vehicle motion, such yielding being resisted by the weight of the brush assembly and/or by suitable restoring means (e.g. a spring).

The above and other features of my invention will be described in detail hereinafter with reference to the accompanying drawing in which.

Figure 1:
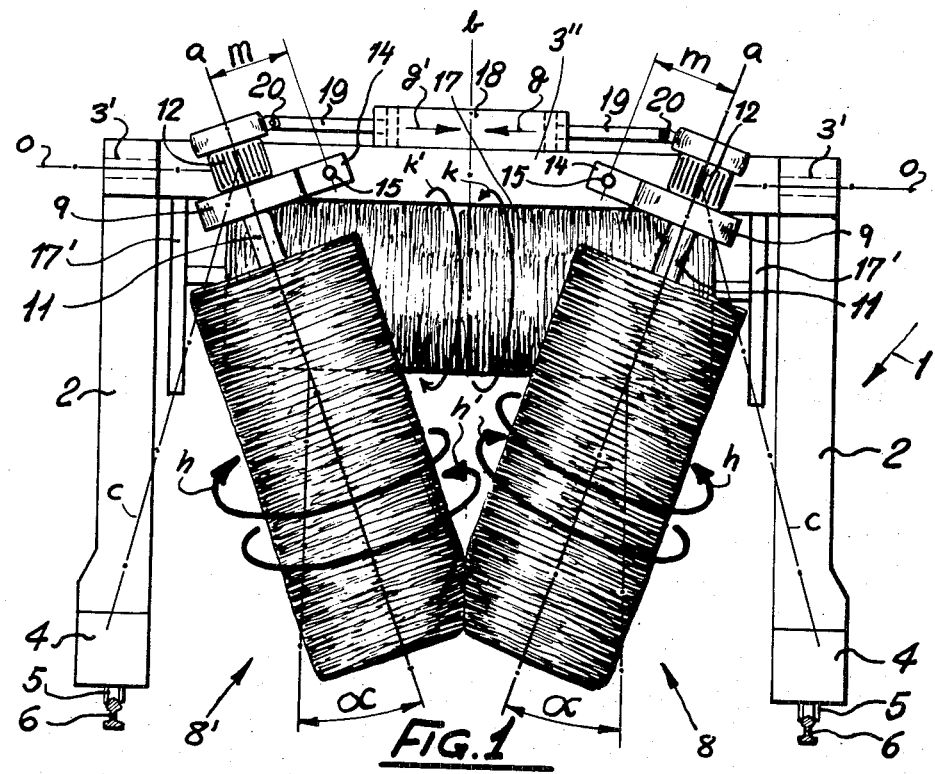
FIG. 1 is a front-elevational view of a portal frame supporting a set of scrubbing brushes according to my invention.
Figure 2:
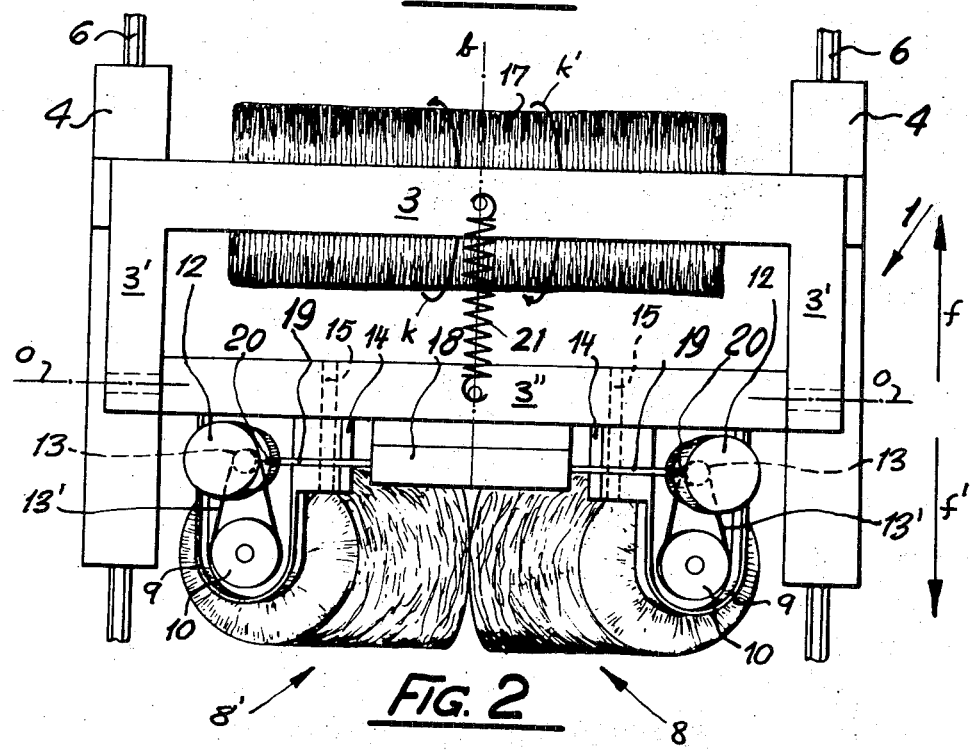
FIG. 2 is a top view of the installation of FIG. 1.

Reference will first be made to FIGS. 1 and 2. The apparatus shown in these Figures comprises a portal frame, generally designated 1, with jambs 2 and a lintel 3 straddling the path of a vehicle V (see FIGS. 7 and 8) to be washed. The frame has a base 4 with pairs of wheels 5 (cf. FIG. 5) riding on rails 6 for reciprocating displacement, by drive means not further illustrated, in the longitudinal direction of the vehicle as indicated by arrows $f$ and $f'$ in FIG. 2. The frame 1 may also carry nozzles (not shown) for dispensing wash water, shampoo or detergent onto the vehicular surfaces to be scrubbed.

The lintel 3 is yoke-shaped in plan view and formed with two side arms 3' in which a bar 3'' is horizontally journaled so as to be rotatable about its longitudinal axis $o$. Bar 3'' swingably supports, by means of pivot pins 15, a pair of brackets 14 forming journal bearings 9 for shafts 11 of two scrubbing brushes 8 and 8'. The top of each shaft 11 carries a V-pulley or sprocket gear 10 linked via a belt or chain 13' with a driving pulley or pinion 13 on the shaft of a respective electric motor 12 carried by the bracket 14, these two motors being jointly reversible for driving the brushes in a first or a second sense of rotation (arrows $h$ and $h'$). Owing to the lateral offset of fulcra 15 from brush axes $a$ by a distance $m$, the brushes 8 and 8' normally assume an inclined position in which these axes include an angle $\alpha$ with the verticle. This angle is so chosen that the lower ends of the brushes contact each other along a central plane $b$ which coincides, in the plan view of FIG. 2, with the centerline of the vehicular path.

A double-acting hydraulic or pneumatic jack 18, on being actuated, withdraws its pistons as indicated by arrows $g$ and $g'$, thus swinging the brushes 8 and 8' outwardly (as indicated diagrammatically by lines $c$) to give passage to a vehicle before or after washing.

A further brush 17 is horizontally suspended from frame 1 and guided in uprights 17'; this brush, provided with nonillustrated drive means, may be raised or lowered, e.g. as disclosed in my prior U.S. Pat. No. 3,500,487, onto the levels of the several upper surfaces of a vehicle to be scrubbed.

The weight of the brushes 8 and 8' not only tilts them toward each other, to an extent determined by the moment arm $m$, but also tends to swing them into the frame opening against the force of a restoring spring 21 anchored to the bar 3" and the lintel 3. The brushes 8 and 8' can thus limitedly yield to the pressure of an incoming vehicle, either against their own weight (upon relative frame motion in the direction of arrow $f$) or against the force of spring 21 (upon motion in the direction $f'$). This yieldable mounting lessens the impact between the brushes and the vehicle at the instant of initial contact and also serves to limit the friction between the brush and the vehicle to a value consistent with a desired rate of transverse brush displacement.

Thus, with the brushes 8, 8' and 17 initially occupying the position illustrated in FIGS. 1 and 2, let us assume that these brushes rotate in the directions indicated by arrows $h$ and $k$ while the frame moves in the direction $f$. Brush 17, upon contacting the hood of the vehicle, successively sweeps the top of the hood, the windshield and the roof, this brush being suitably counterbalanced to ride up the upper vehicle surfaces by virtue of its own rotation and/or under the control of conventional sensors not shown. As soon as the brushes 8 and 8' touch the front of the vehicle, their sense of rotation causes them to swing outwardly about pins 15 at a rate enabling an effective scrubbing of the two halves of that surface by these brushes; this outward motion could be assisted, if desired, by the controlled admission of fluid to jack 18. With brushes 8 and 8' substantially vertical so as to bracket the vehicle therebetween, resumption of the previously arrested relative frame motion results in the sweeping of the lateral vehicle surfaces; at the end of the sweep, that motion is once more halted whereupon the brushes return to their original inclined position along the rear surface of the vehicle so that the latter is also scrubbed. The procedure can now be repeated with reversal of the frame motion (arrow $f'$) and of the sense of brush rotation (arrows $h'$ and $k'$) for a second washing.

In FIGS. 3–6 we have shown a generally similar apparatus in which corresponding elements have been given the same designation as in FIGS. 1 and 2 supplemented by a "1" in the position of the hundreds digit. Thus, brushes 108 and 108' are suspended from the lintel 103 of a frame 101 and are reversibly rotatable about their axes $a$ by means of motors 112 and transmissions 110, 111, 113, 113', their mounting brackets 114 being fulcrumed by pins 115 to respective base plates 107 secured to opposite surfaces of lintel 103. If desired, this lintel could also be rotatably mounted in the manner shown for bar 3" in FIGS. 1 and 2, with provision of biasing springs or the like to tend to maintain it in a normal position. In this embodiment, in which the horizontal brush 17 of FIGS. 1 and 2 has been omitted, the brushes 108 and 108' are free to swing past each other through arcs of at least 90°, i.e. between an elevated horizontal position represented by a line $c$ and laterally offset vertical positions indicated by lines $d$. In the normal inclined position their lower ends cross in the region of midplane $b$.

Figure 3:
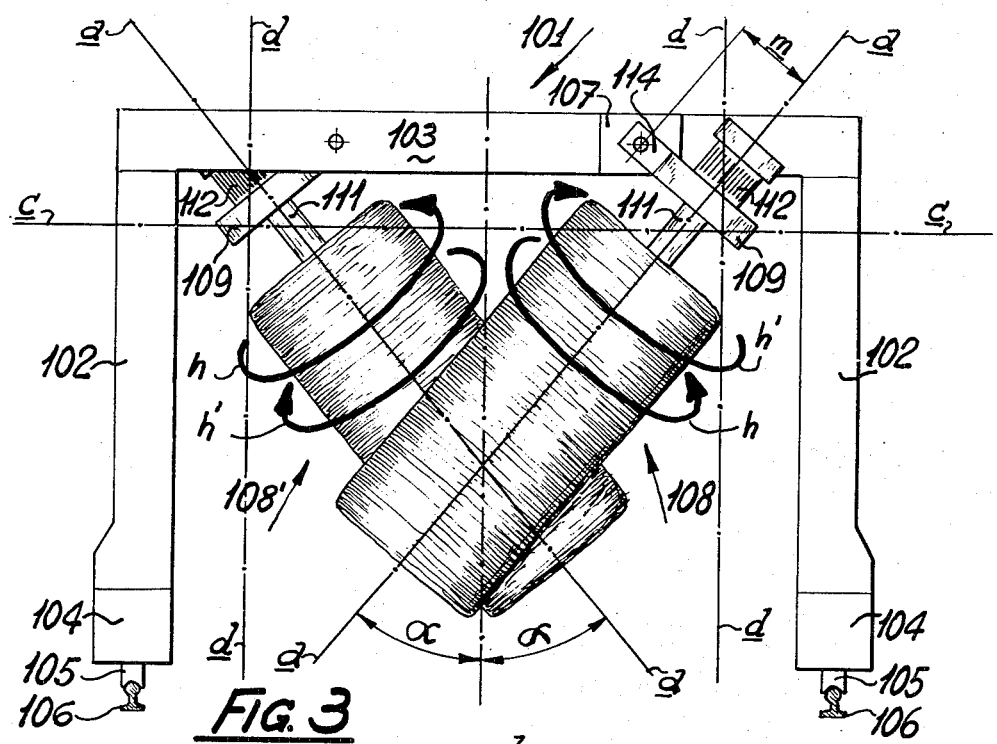
FIG. 3 is a front view similar to FIG. 1, illustrating another embodiment.
Figure 4:
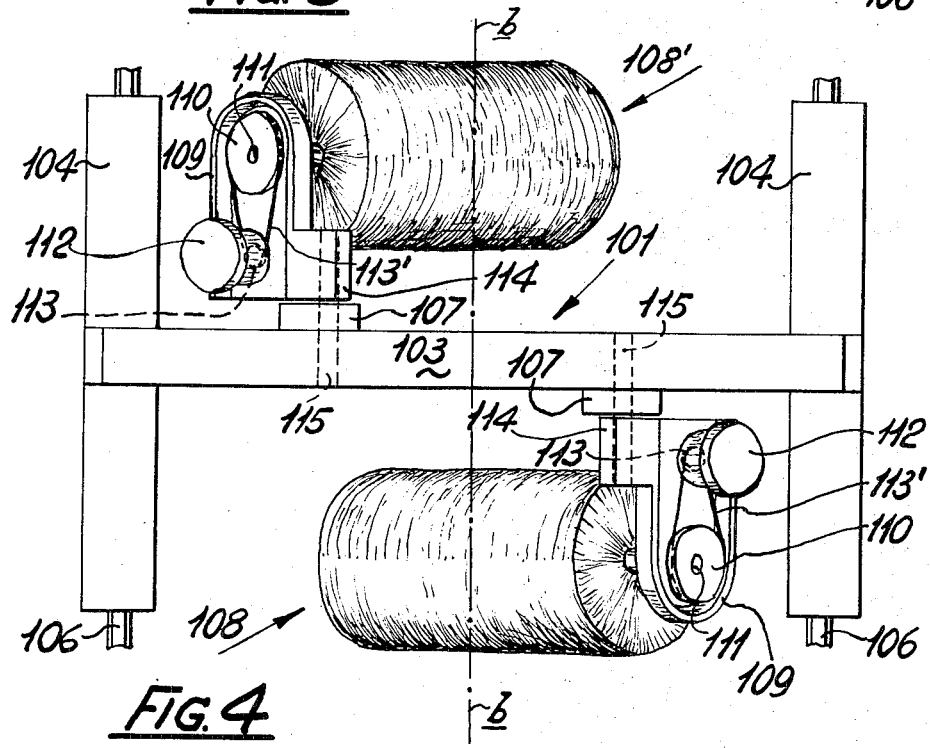
FIG. 4 is a top view of the assembly of FIG. 3.
Figure 5:
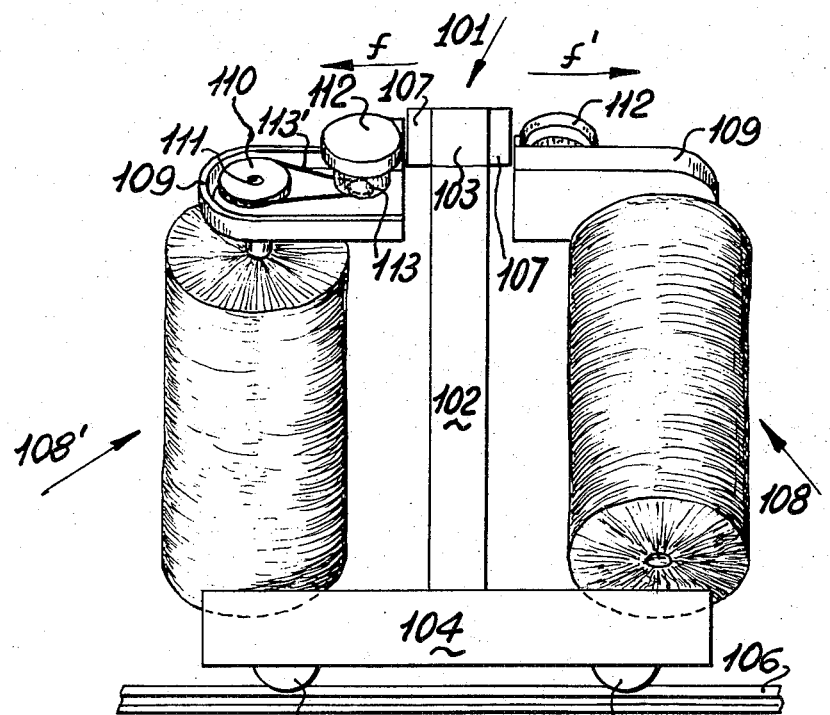
FIG. 5 is a side-elevational view of the assembly shown in FIGS. 3 and 4.
Figure 6:
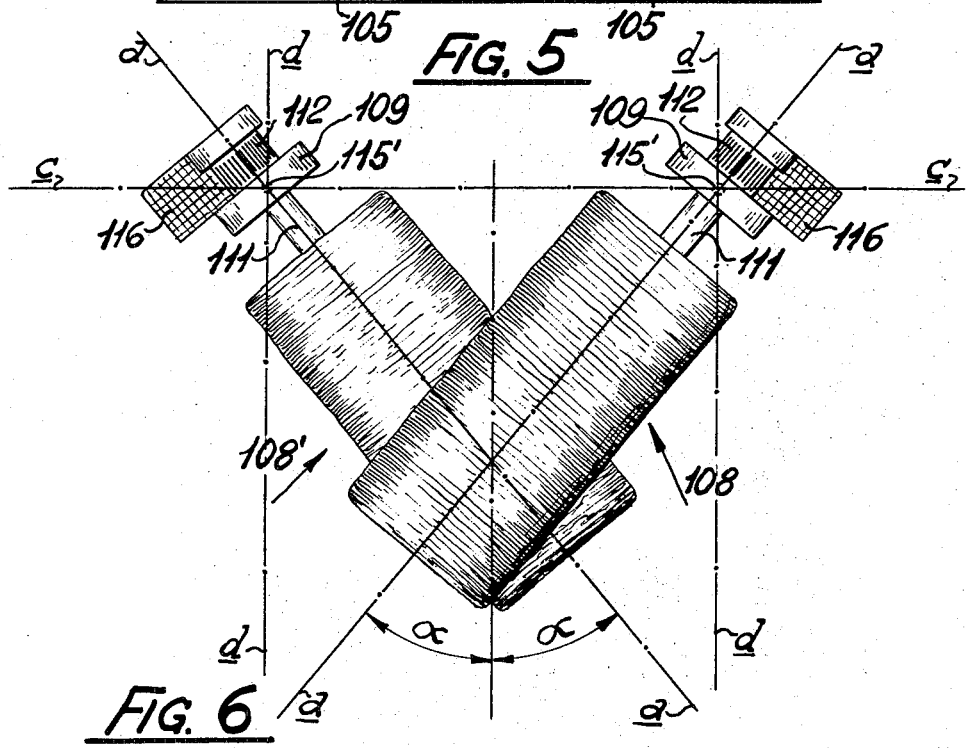
FIG. 6 is a front view of the brushes of FIG. 3 without their frame, showing a modification.

In the system of FIGS. 3–5 this inclined position is again brought about by the offsetting of the pins 115 from the brush axes $a$ by a distance $m$ representing a moment arm; in FIG. 6 the pins 115 have been replaced by pins 115' passing through the brush axes, the inclination being caused by weights 116 carried on the mounting brackets 114 which form the journal bearings 109 for brush shaft 111. Such weights, of course, could be combined with a certain eccentricity of pins 115' and could also be used in the embodiment of FIGS. 1 and 2.

Figure 7:
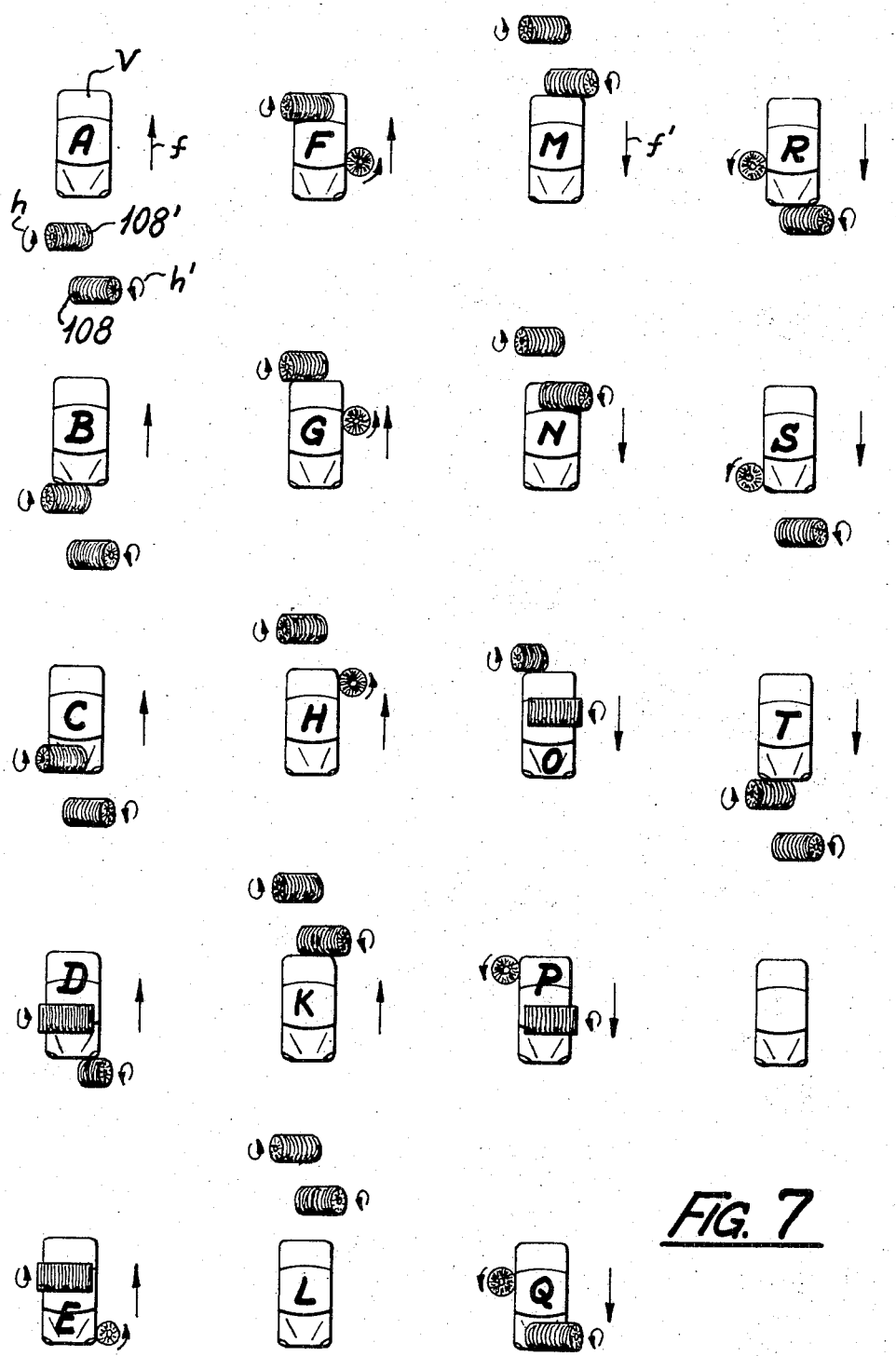
FIG. 7 is a set of diagrammatic plan views showing successive phases of a scrubbing cycle performed with the installation of FIGS. 3 - 5.

Let us now consider the operation of the system of FIGS. 3–6 in connection with FIG. 7 in which it is assumed that the frame 101 moves in the direction $f$ (relative to vehicle V) during a first traverse, represented by diagrams A–K, and in the direction $f'$ during a second traverse represented by diagrams M–T; brushes 108 and 108' rotate in the sense $h$ throughout the cycle.

In position A the frame approaches the vehicle V whose front end is contacted by the brush 108' in position B. With the indicated sense of rotation, brush 108' now swings counterclockwise (as viewed in FIGS. 3 and 6) toward its horizontal position, thereby successively sweeping the hood (position C), the windshield (position D), the roof (position E) and the trunk (position F). Meanwhile, in position D, the other brush 108 also contacts the front end of the vehicle and, rotating in the same sense as brush 108', is also swung counterclockwise into its horizontal attitude (position E) in which it sweeps the adjoining lateral surface of the vehicle (i.e. its left side as seen from the driver's seat) in positions F–H. In position G, brush 108' swings back in a clockwise direction to sweep part of the rear surface of the vehicle; at this instant, as also during the sweeping of the front surface in position B and similar operations in subsequent positions, the frame motion may be temporarily halted. In position K the brush 108, arriving at the rear end of the vehicle, swings up clockwise and also scrubs part of the rear surface. Diagram L shows the two brushes disengaged from the vehicle.

In position M the brush 108 again contacts the rear surface of the car and by this engagement is swung up (clockwise) for another scrubbing of that surface. In the following positions N–R brush 108 sweeps the top of the car whereas brush 108', coming to rest against the rear car surface, swings clockwise into its vertical position and sweeps the other (right-side) lateral surface of the vehicle. In the final position T, brush 108' swings once more across the front surface of the vehicle.

Figure 8:
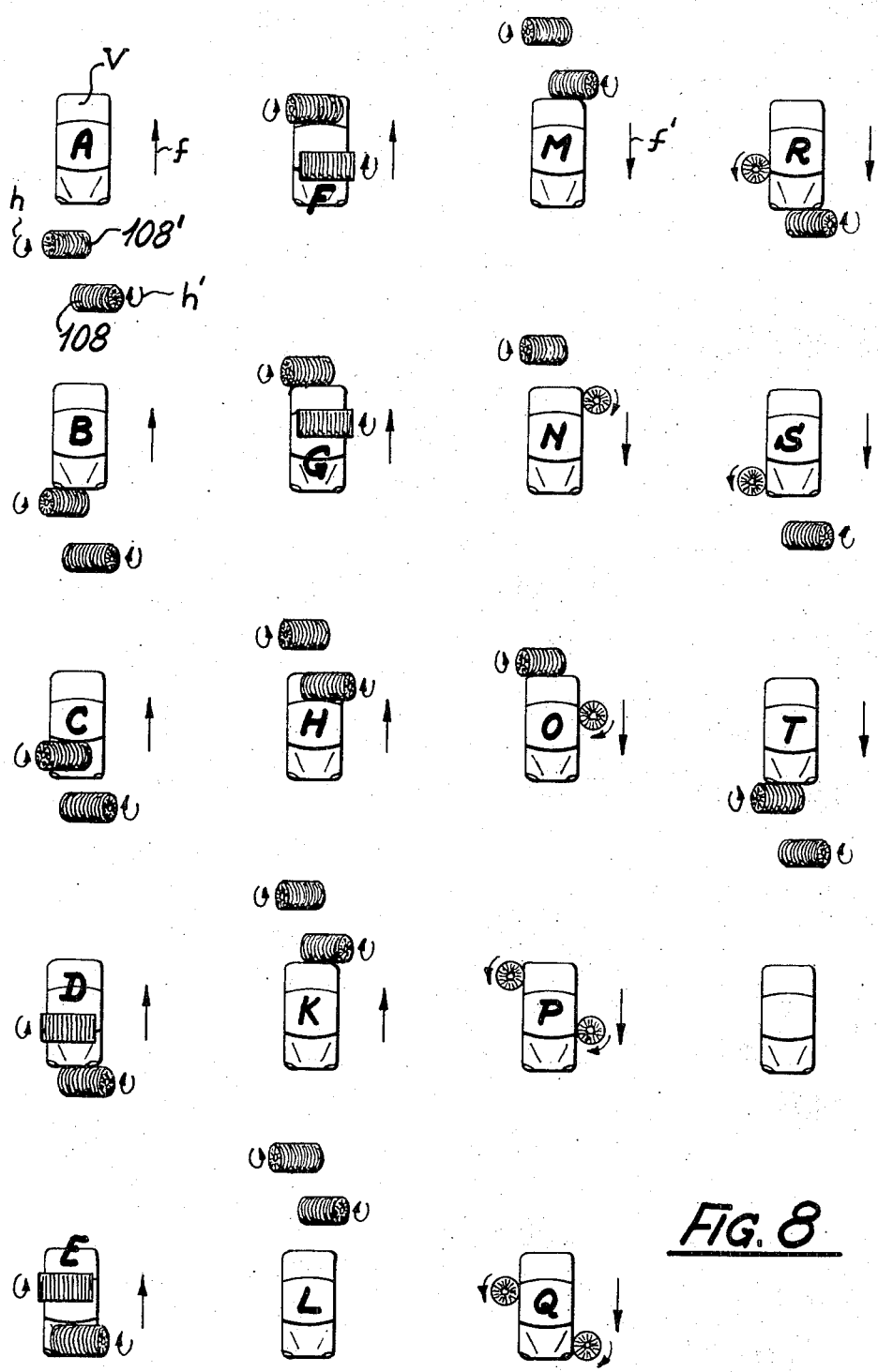
FIG. 8 is a set of views similar to those of FIG. 7 but illustrating an alternate mode of operation.

FIG. 8 illustrates a similar set of successive washing phases in which, however, brushes 108 and 108' rotate in directions $h'$ and $h$, respectively. Brush 108' again contacts the front surface of the car in position B and then swings up, counterclockwise, to sweep its upper surfaces in positions C–G. Brush 108, with its reverse rotation, is also swung upward (clockwise) upon encountering the front end (in position D), its sweep of the upper surfaces being completed in position K. During the return phase (arrow f'), brush 108 in position M and brush 108' in position O are swung in opposite directions to sweep respective lateral surfaces of the vehicle, brush 108 cleaning the front in position R whereas brush 108' does the same in position T. Again, the frame motion may be briefly arrested during the sweeping of the transverse front and rear surfaces.

Jack 18 of FIGS. 1 and 2 could also be used, if desired, in the system of FIGS. 3–6 for the purpose of spreading the brushes apart and/or for assisting the sweeping motion across the front and rear ends of the vehicle.

I claim:

1. An apparatus for washing a vehicle, comprising:
a portal frame straddling a predetermined path of a vehicle to be washed, said frame and said vehicle being relatively movable along said path;
a pair of rotary scrubbing brushes fulcrumed near respective corners of said frame for swinging movement in a plane perpendicular to said path, said brushes being balanced to hang down along downwardly converging inclined axes; and
drive means for imparting rotary and swinging motion to said brush.

2. An apparatus as defined in claim 1 wherein said brushes in an idle condition have their lower ends disposed substantially at a centerline of said path.

3. An apparatus as defined in claim 2 wherein said brushes are mounted on opposite faces of said frame with their lower ends crossing over the region of said centerline.

4. An apparatus as defined in claim 1 wherein said brushes are pivoted to at least one member of said frame rotatable about a horizontal axis transverse to said path whereby each brush can yield to pressure in the direction of relative vehicle motion.

5. An apparatus as defined in claim 1, further comprising a supplemental horizontal scrubbing brush carried on said frame for sweeping an upper vehicle surface, said pair of brushes being swingable laterally outwardly for sweeping end and side surfaces of the vehicle.

6. An apparatus as defined in claim 5 wherein said pair of brushes are mounted on one face of said frame, said supplemental brush being mounted on the opposite face.

7. An apparatus as defined in claim 1 wherein said brushes are provided with jack means for swinging same laterally outwardly to clear the path of the vehicle.

8. An apparatus as defined in claim 1 wherein each of said brushes is swingable through substantially 90° between a substantially vertical and a substantially horizontal position.

9. An apparatus as defined in claim 1 wherein said brushes are provided with respective shafts and with brackets forming journal bearings for said shafts pivoted to said frame, said drive means including respective motors carried on said brackets above said journal bearings.

10. An apparatus as defined in claim 9 wherein said brackets are provided with transverse arms pivoted to said frame at fulcra offset from their axes of rotation.

11. An apparatus as defined in claim 9 wherein said brackets are provided with off-axial weight means for tilting said brushes.

* * * * *